US009788256B2

(12) United States Patent
Buford et al.

(10) Patent No.: US 9,788,256 B2
(45) Date of Patent: *Oct. 10, 2017

(54) REDUCTION OF WIRELESS COMMUNICATION COSTS IN ENTERPRISES

(71) Applicant: Avaya Inc., Basking Ridge, NJ (US)

(72) Inventors: John Buford, Princeton, NJ (US); Venkatesh Krishnaswamy, Holmdel, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,459

(22) Filed: May 28, 2013

(65) Prior Publication Data

US 2013/0252619 A1 Sep. 26, 2013

Related U.S. Application Data

(63) Continuation of application No. 11/854,440, filed on Sep. 12, 2007, now Pat. No. 8,452,303, which is a
(Continued)

(51) Int. Cl.
*H04W 24/00* (2009.01)
*H04W 40/20* (2009.01)
(Continued)

(52) U.S. Cl.
CPC ............. *H04W 40/20* (2013.01); *H04Q 3/66* (2013.01); *H04W 8/06* (2013.01);
(Continued)

(58) Field of Classification Search
None
See application file for complete search history.

(56) References Cited

U.S. PATENT DOCUMENTS

| 5,638,432 A | 6/1997 | Wille et al. |
| 5,818,921 A | 10/1998 | Vander Meiden et al. |

(Continued)

FOREIGN PATENT DOCUMENTS

| GB | 2355624 A | 4/2001 |
| GB | 2447553 A | 9/2008 |

(Continued)

OTHER PUBLICATIONS

Mr. Jared Stokes, "GB Patent Application No. GB0813044.5 Search Report", Oct. 22, 1980, Publisher: UK Intellectual Property Office, Published in GB.

(Continued)

*Primary Examiner* — Willie J Daniel, Jr.
(74) *Attorney, Agent, or Firm* — Sheridan Ross P.C.

(57) ABSTRACT

Methods and apparatus are disclosed for reducing wireless telecommunication costs for enterprises having a plurality of PBX-equipped sites, connected by either a public network (e.g., the PSTN, the Internet, etc.), a private network (e.g., leased lines, a virtual private network [VPN] over the Internet, etc.), or some combination of public and private networks. In particular, the illustrative embodiments of the present invention attempt to reduce telecommunication costs by advantageously routing calls from an off-premises wireless terminal belonging to the enterprise via one or more of the enterprise's private branch exchanges. The present invention is especially advantageous in that it can reduce telecommunication costs for calls from an off-premises wireless terminal to any type of destination: another cell phone, a wireline terminal, a private branch exchange, etc.

18 Claims, 14 Drawing Sheets

Related U.S. Application Data continuation-in-part of application No. 11/780,127, filed on Jul. 19, 2007, now Pat. No. 7,885,399.

(51) Int. Cl.
| | |
|---|---|
| *H04Q 3/66* | (2006.01) |
| *H04W 8/06* | (2009.01) |
| *H04W 4/02* | (2009.01) |
| *H04W 84/16* | (2009.01) |

(52) U.S. Cl.
CPC ............ *H04Q 2213/1322* (2013.01); *H04Q 2213/13097* (2013.01); *H04Q 2213/13098* (2013.01); *H04Q 2213/13103* (2013.01); *H04Q 2213/13138* (2013.01); *H04Q 2213/13141* (2013.01); *H04W 4/02* (2013.01); *H04W 84/16* (2013.01)

(56) References Cited

U.S. PATENT DOCUMENTS

| | | | |
|---|---|---|---|
| 5,890,064 A * | 3/1999 | Widergen et al. ............ 455/445 |
| 5,963,864 A | 10/1999 | O'Neil et al. |
| 6,141,562 A * | 10/2000 | Eriksson ...................... 455/555 |
| 6,148,193 A * | 11/2000 | Miska et al. .................. 455/410 |
| 6,308,070 B1 * | 10/2001 | Laster ........................... 455/445 |
| 6,337,857 B1 | 1/2002 | Booton |
| 6,381,315 B1 | 4/2002 | Nhaissi |
| 6,587,555 B1 | 7/2003 | Cripe et al. |
| 6,608,831 B1 | 8/2003 | Beckstrom et al. |
| 6,648,990 B2 | 11/2003 | Yoshizawa |
| 6,748,064 B2 | 6/2004 | Zbib |
| 6,771,636 B1 | 8/2004 | Feyaerts |
| 6,775,272 B2 | 8/2004 | Galvin et al. |
| 6,856,806 B1 | 2/2005 | Bosik et al. |
| 6,892,070 B2 * | 5/2005 | Warrier ................. H04W 8/12 455/432.1 |
| 6,950,507 B1 | 9/2005 | Kaplan |
| 7,006,833 B1 | 2/2006 | Contractor |
| 7,016,343 B1 | 3/2006 | Mermel et al. |
| 7,082,119 B1 | 7/2006 | Tamsil |
| 7,181,210 B2 | 2/2007 | Zabawskyj et al. |
| 7,194,268 B1 | 3/2007 | Bosik et al. |
| 7,577,431 B2 * | 8/2009 | Jiang ....................... H04W 8/26 455/413 |
| 7,586,861 B2 * | 9/2009 | Kubler .................. G06F 1/1626 370/310 |
| 7,602,897 B2 | 10/2009 | Blickberndt et al. |
| 8,259,922 B2 * | 9/2012 | Abramson et al. ........... 379/225 |
| 8,452,303 B2 * | 5/2013 | Buford ..................... H04Q 3/66 455/445 |
| 2002/0004394 A1 | 1/2002 | Tsai et al. |
| 2003/0076816 A1 | 4/2003 | Naranjo et al. |
| 2003/0092440 A1 | 5/2003 | Warrier et al. |
| 2004/0043752 A1 * | 3/2004 | Matsumura ................... 455/405 |
| 2004/0235467 A1 * | 11/2004 | Tuilier ....................... 455/422.1 |
| 2005/0084087 A1 * | 4/2005 | Rajagopalan et al. ... 379/205.01 |
| 2006/0159246 A1 | 7/2006 | Abramson et al. |
| 2006/0239252 A1 * | 10/2006 | Kantak et al. ................ 370/352 |
| 2006/0256789 A1 | 11/2006 | Otto et al. |
| 2008/0227439 A1 * | 9/2008 | Abramson et al. ........... 455/417 |
| 2009/0149220 A1 * | 6/2009 | Camilleri .............. H04W 8/183 455/558 |

FOREIGN PATENT DOCUMENTS

| | | |
|---|---|---|
| JP | H06-172673 | 7/1996 |
| JP | H08-214066 | 8/1996 |
| JP | H08-275238 | 10/1996 |
| JP | H09-154174 | 6/1997 |
| JP | 2002-502165 | 12/1998 |

OTHER PUBLICATIONS

Harry S. Hong, "U.S. Appl. No. 11/780,127 Office Action Jul. 12, 2010", Publisher: USPTO, Published in US.

Harry S. Hong, "U.S. Appl. No. 11/780,127 Office Action Feb. 22, 2010", Publisher: USPTO, Published in US.

Steckert, "DE Application No. 10-2008 032 865.0-31 Office Action May 26, 2009", Publisher: DPMA, Published in DE.

Steckert, "DE Application No. 10 2008 032 865.0-31 Office Action Dec. 7, 2009", Publisher: DPMA, Published in DE.

* cited by examiner

Figure 2 (PRIOR ART)

| PBX On-Premises Telephone Number | Off-Premises Telephone Number |
|---|---|
| 732-555-0102 x11 | 201-555-1236 |
| 732-555-0102 x12 | 908-555-3381 |
| ⋮ | ⋮ |
| 732-555-0102 x99 | 212-555-6784 |

REDUCTION OF WIRELESS COMMUNICATION COSTS IN ENTERPRISES

CROSS REFERENCE TO RELATED APPLICATIONS

This application is a continuation of U.S. patent application Ser. No. 11/854,440, filed Sep. 12, 2007, which is a continuation-in-part of U.S. patent application Ser. No. 11/780,127, filed 19 Jul. 2007, now U.S. Pat. No. 7,885,399, issued Feb. 8, 2011, entitled "Cost-Conscious Telecommunications Terminal", which is incorporated by reference.

FIELD OF THE INVENTION

The present invention relates to telecommunications in general, and, more particularly, to reducing wireless communications costs for enterprises.

BACKGROUND OF THE INVENTION

An organization that desires to provide employees at one location with telephones has, in general, two options. First, the organization can acquire one telephone and one telephone line per employee from the telephone company. Second, the organization can acquire one telephone per employee, a small number of telephone lines from the telephone company, and a piece of equipment that enables the employee's telephones to share the small number of telephone lines. In general, the second option is substantially less expensive than the first option, and the piece of equipment that enables the employees' telephones to share the small number of telephone lines is called a "private-branch exchange" or "PBX." In addition, private-branch exchanges typically provide a variety of useful telecommunications features to their users, such as call forwarding, three-way conferencing, and so forth.

FIG. 1 depicts a schematic diagram of telecommunications system 100 in the prior art. Telecommunications system 100 comprises affiliated off-premises telecommunications terminals 101-1 through 101-X, wherein X is a positive integer; unaffiliated off-premises telecommunications terminal 102; affiliated on-premises telecommunications terminals 103-1 through 103-X; private branch exchange telephone system 104; and telecommunications network 105, interconnected as shown.

The terms "affiliated" and "unaffiliated," as they apply to the off-premises terminals, refer to whether an off-premises terminal is affiliated with an on-premises terminal (i.e., a terminal served by private branch exchange 104). The relationship of an on-premises terminal (e.g., terminal 103-1, etc.) with an affiliated off-premises terminal (e.g., terminal 101-1, etc.) is described below and with respect to FIG. 2, with regards to extending a received call to one or both terminals.

Private branch exchange 104 is capable of switching incoming calls from telecommunications network 105 (e.g., the Public Switched Telephone Network, etc.) via one or more transmission lines to any of on-premises terminals 103-1 through 103-N. Private branch exchange 104 is also capable of handling outgoing calls from any of on-premises terminals 103-1 through 103-N to telecommunications network 105 via one or more transmission lines that connect private branch exchange 104 to telecommunications network 105.

Private branch exchange 104 is capable of also extending an incoming call to a telephone number in telecommunications network 105, in addition to switching the incoming call to on-premises terminal 103-n, wherein n is an integer between 1 and N, inclusive. The telephone number that is extended-to in telecommunications network 105 corresponds to an affiliated terminal 101-n.

FIG. 1 also depicts the address spaces that are relevant to telecommunications network 100 in the prior art. The term "address space" refers to an addressable region of telephone service. Address space 111 represents the addressable region served by telecommunications network 105. Address space 112 represents the addressable region served by private branch exchange 104.

Private branch exchange 104 acts as a "bridge" between address space 111 and address space 112. When a calling party places a call to someone served by private branch exchange 104, the calling party uses a dialing sequence that includes a telephone number that belongs to telecommunications network 105 and residing in address space 111. As part of the dialing sequence, the calling party also uses an extension number that allows access to one of the on-premises telecommunications terminals that reside within address space 112.

Thus an on premises telephone number is one that exists within the address space of the private branch exchange, and an off-premises telephone number is one that exists within the address space of the Public Switched Telephone Network.

Some private branch exchanges enable the user of an on-premises terminal to associate an off-premises terminal's telephone number (e.g., the user's cell phone number, etc.) with the on-premises terminal's telephone number for features such as automatic call forwarding. In such instances the off-premises terminal's telephone number is said to be mapped to the on-premises terminal's telephone number. Typically a private branch exchange that provides such a mapping feature stores the mappings in a table, such as the one shown in FIG. 2.

When an enterprise user's on-premises terminal is affiliated with his off-premises wireless terminal, the enterprise user can seamlessly and transparently:
  place calls from his wireless terminal that appear to originate from his on-premises terminal;
  receive calls that are directed to his on-premises terminal on his wireless terminal; and
  access all of the features of the enterprise's private branch exchange from his wireless terminal
from anywhere in the world. While these capabilities enable unprecedented worker mobility, they also can result in huge international roaming costs for global enterprises.

SUMMARY OF THE INVENTION

The present invention overcomes some of the disadvantages of the prior art by potentially reducing wireless telecommunication costs for enterprises that have a plurality of PBX-equipped sites, connected by either a public network (e.g., the PSTN, the Internet, etc.), a private network (e.g., leased lines, a virtual private network [VPN] over the Internet, etc.), or some combination of public and private networks. In particular, the illustrative embodiments of the present invention attempt to reduce telecommunication costs by advantageously routing calls from an affiliated off-premises wireless terminal (e.g., cell phone, etc.) to its destination via one or more of the enterprise's private branch exchanges. The present invention is especially advantageous in that it can reduce telecommunication costs for calls from an off-premises wireless terminal to any type of destination: another cell phone, a wireline terminal, a private branch exchange, and so forth. Some illustrative scenarios include:

- an employee who is on business travel in the UK might call a supplier in Taiwan;
- an employee who is on business travel in St. Louis might call a customer in New Jersey; or
- an employee who is at a restaurant near his or her office in New York might call a fellow employee in San Francisco.

In accordance with the illustrative embodiments of the present invention, changes in the geo-location of an off-premises affiliated wireless terminal (e.g., cell phone, etc.) are tracked via a registration process, and the enterprise private branch exchange that is "closest" to the cell phone (i.e., that can communicate with the wireless terminal with least cost) is automatically determined by a data-processing system (i.e., server, etc.). This "closest" private branch exchange is referred to as the "visitor PBX."

The data-processing system then updates, as necessary, the cost of routes between the wireless terminal and the private branch exchange with which the terminal is affiliated (i.e., the "home PBX") and determines the least-cost route. In accordance with the first illustrative embodiment, the least-cost route information is disseminated to all enterprise private branch exchanges that have requested to subscribe to these updates, while in the second and third illustrative embodiments this information remains centralized at the data-processing system. Subsequently, calls made from the wireless terminal as well as calls directed to the wireless terminal via its home PPX are routed in accordance with the least-cost route information, thereby reducing the cost of calls in which the wireless terminal participates.

In accordance with the illustrative embodiments of the present invention, changes in the identity of an off-premises affiliated wireless terminal (e.g., a change of telephone number as a result of replacing the terminal's SIM card, etc.) are tracked and processed in a similar manner. In addition, the terminal's home PBX is accordingly notified of the identity change so that the PBX will forward the correct calls to the wireless terminal (i.e., calls made to the on-premises telephone number associated with the new wireless terminal identity).

The illustrative embodiments comprise: receiving at a data-processing system (i) an indication of the geo-location of a wireless telecommunications terminal, and (ii) an indication that the telephone number of said wireless telecommunications terminal has changed from $M_1$ to $M_2$, wherein said wireless telecommunications terminal is associated with a telephone number N in the address space of a first private branch exchange, and wherein said telephone numbers $M_1$ and $M_2$ are not in the address space of said first private branch exchange; and transmitting from said data-processing system to said first private branch exchange a signal that causes said telephone number N to be mapped to said telephone number $M_2$ instead of $M_1$.

BRIEF DESCRIPTION OF THE DRAWINGS

FIG. 2 depicts an illustrative table mapping off-premises telephone numbers to on-premises telephone numbers, in accordance with the prior art.

DETAILED DESCRIPTION

Figure 1:
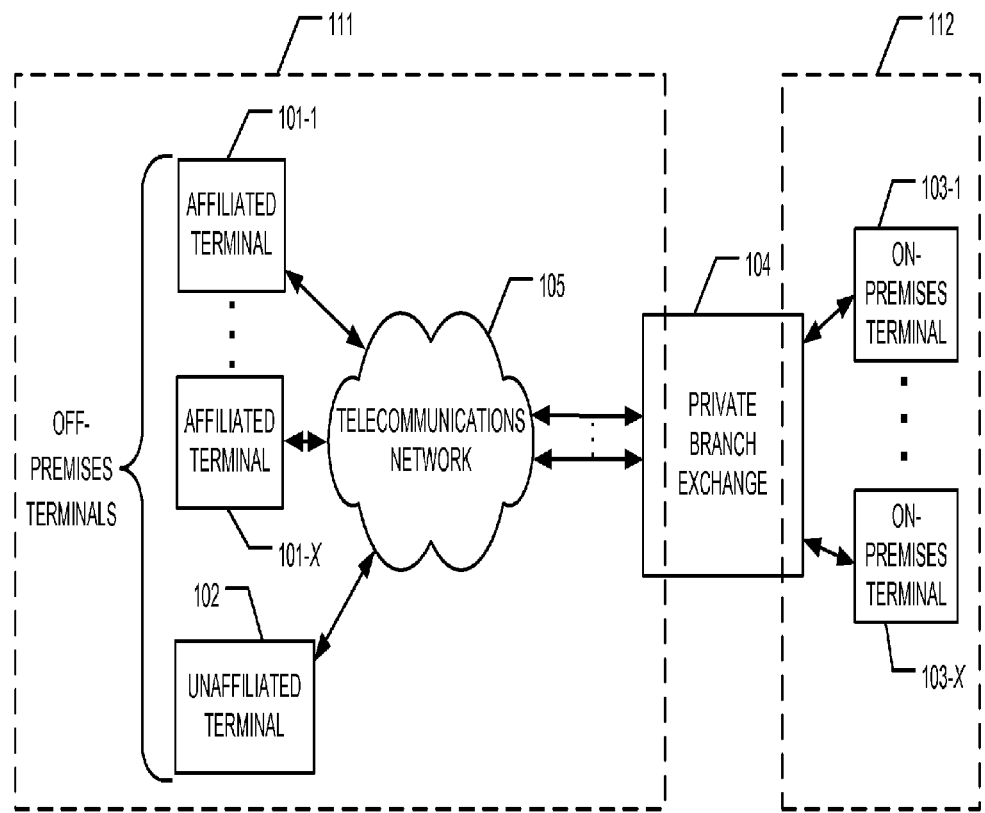
FIG. 1 depicts a schematic diagram of telecommunications system 100, in accordance with the prior art.
Figure 3:
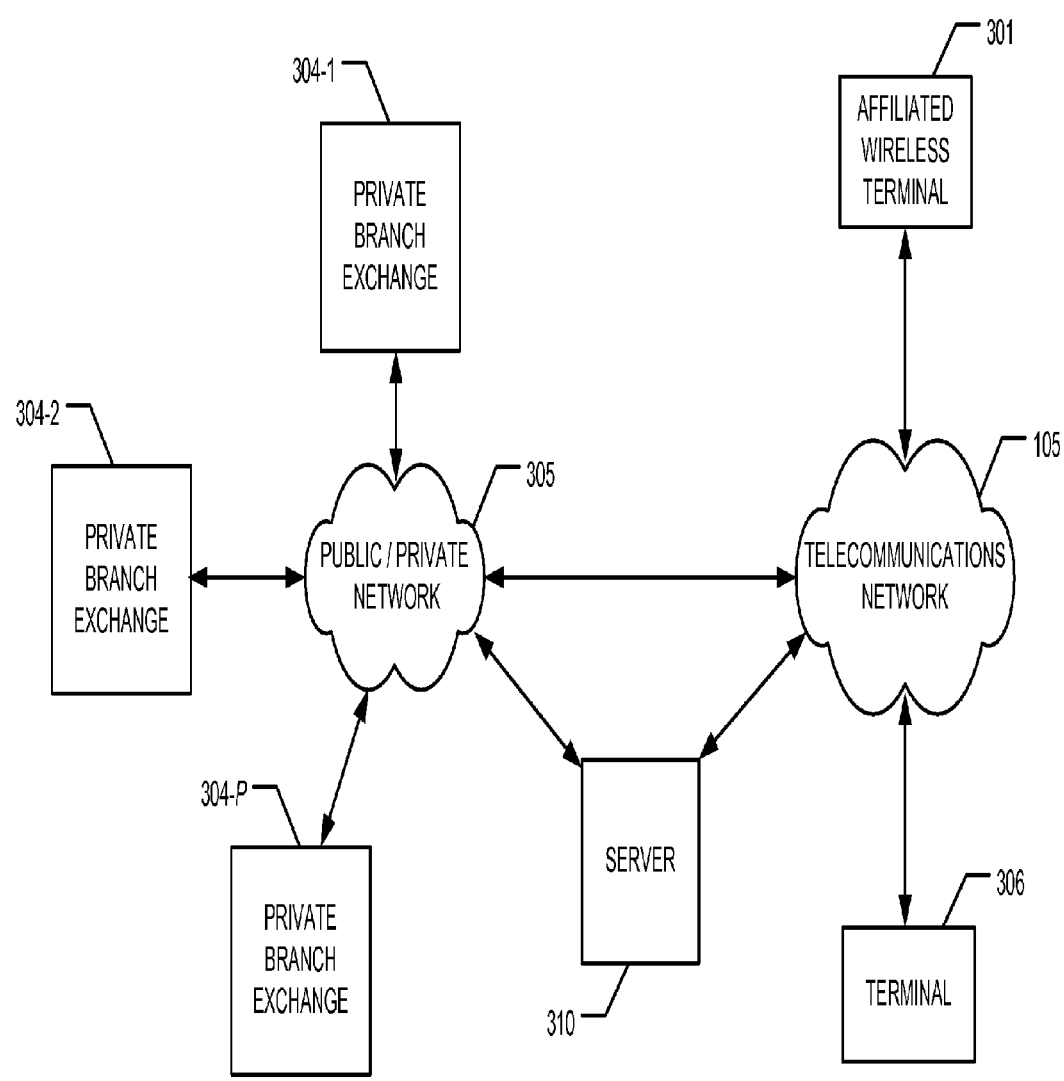
FIG. 3 depicts a schematic diagram of telecommunications system 300, in accordance with the illustrative embodiments of the present invention.

FIG. 3 depicts a schematic diagram of telecommunications system 300, in accordance with an illustrative embodiment of the present invention. Telecommunications system 300 comprises telecommunications network 105, private branch exchanges 304-1 through 304-P, where P is an integer greater than one, network 305, off-premises affiliated wireless terminal 301, telecommunications terminal 306, and server 310, interconnected as shown.

Private branch exchanges 304-1 through 304-P are capable of providing all the functionality of private branch exchange 104 of the prior art, of transmitting and receiving signals among one another via network 305, and of performing the functions described below and with respect to FIGS. 5 through 14. As will be appreciated by those skilled in the art, in some embodiments of the present invention private branch exchanges 304-1 through 304-P might be instances of some other type of routing or switching element, rather than what is historically connoted by the terms "private branch exchange" or "PBX," and it will be clear to those skilled in the art, after reading this disclosure, how to make and use embodiments of the present invention that comprise such alternative routing or switching elements.

Network 305 is capable of transporting signals among private branch exchanges 304-1 through 304-P, of transmitting and receiving signals via telecommunications terminal 105, and of transmitting signals to and receiving signals from server 310, in well-known fashion. In some embodiments network 305 might be a public network (e.g., the PSTN, the Internet, etc.), while in some other embodiments network 305 might be a private network (e.g., leased lines, a virtual private network [VPN] over the Internet, etc.), while in still some other embodiments network 305 might be a combination of public and private networks.

Off-premises affiliated wireless terminal 301 is a wireless telecommunications terminal that is affiliated with some on-premises terminal of one of private branch exchanges 304-1 through 304-P. The particular private branch exchange and on-premises terminal with which terminal 301 is affiliated is immaterial—it matters only that terminal 301 is affiliated with some on-premises terminal of the organization.

Figure 4:
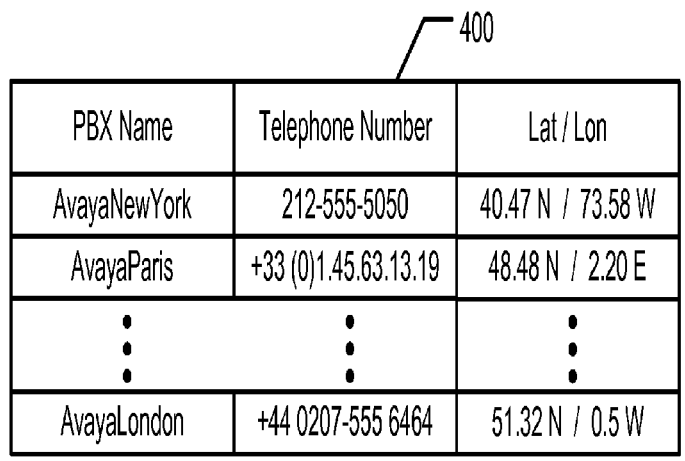
FIG. 4 depicts illustrative table 400 in accordance with the illustrative embodiments of the present invention.

In accordance with the illustrative embodiment, affiliated wireless terminal 301 is capable of storing the Internet Protocol address of server 310, and of transmitting signals to and receiving signals from server 310. In addition, affiliated wireless terminal 301 is capable of accessing the contents of a table of information about the organization's private branch exchanges (e.g., their phone numbers, their geo-locations, etc.)—such as illustrative table 400 shown in FIG. 4—and of performing the functions described below and with respect to FIGS. 5 through 14. As will be appreciated by those skilled in the art, in some embodiments illustrative table 400 might be stored locally at affiliated wireless terminal 301, while in some other embodiments illustrative table 400 might be stored elsewhere (e.g., server 310, etc.) and accessed remotely by terminal 301. In either case, it will be clear to those skilled in the art, after reading this disclosure, how to make and use affiliated wireless terminal 301.

Server 310 is a data-processing system that is capable of transmitting and receiving signals via telecommunications network 105 and network 305, of populating and updating illustrative table 400, and of performing the functions described below and with respect to FIGS. 5 through 14.

Figure 5:
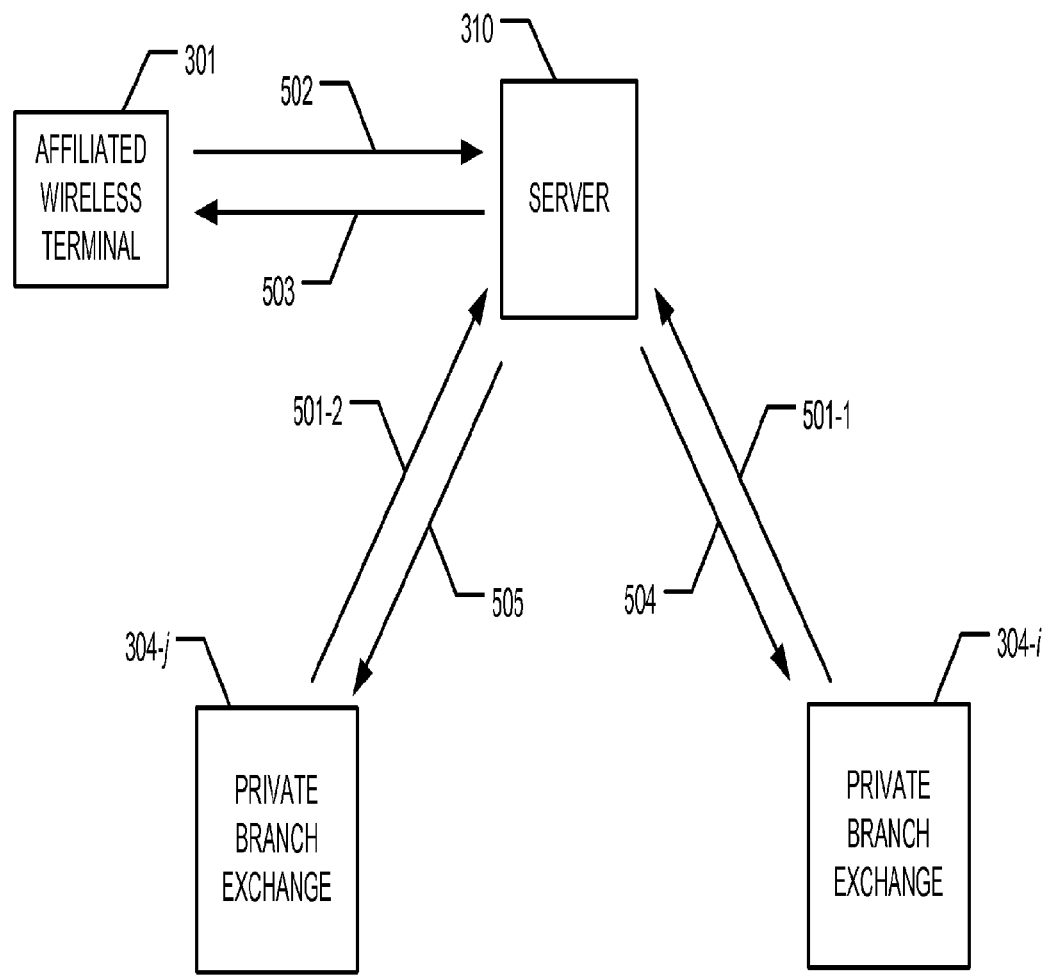
FIG. 5 depicts the transmission of signals among elements of telecommunications system 300 during registration of affiliated wireless terminal 301 in response to an identity change at terminal 301, in accordance with the first illustrative embodiment of the present invention.

FIG. 5 depicts the transmission of signals among elements of telecommunications system 300 during registration of affiliated wireless terminal 301 in response to an identity change at terminal 301, in accordance with the first illustrative embodiment of the present invention. In particular, FIG. 5 depicts the transmission of signals among affiliated wireless terminal 301, server 310, home private branch exchange 304-i, and visitor private branch exchange 304-j.

As is the case for subsequent FIGS. 6 through 14, FIG. 5 is logical in nature; i.e., it depicts the transmission of signals among elements of telecommunications system 300 in an abstract, rather than physical, fashion, and does not include a depiction of any particular conduits of transmission (e.g., network 105, network 305, etc.) or intermediate nodes that might be present in the actual physical transmission path (e.g., a Session Initiation Protocol server for a Voice over Internet Protocol call, etc.). It will be clear to those skilled in the art, after reading this disclosure, how to make and use embodiments of the present invention in accordance with FIG. 5; moreover, it will be clear to those skilled in the art, after reading this disclosure, which signal transmissions of FIG. 5 can be performed simultaneously or in a different order than that depicted.

Signal transmissions are depicted in FIG. 5 as arrows between nodes, where the temporal sequence of transmissions is in accordance with the arrows' numerical labels, in ascending order.

At signal transmission 501, one or more enterprise private branch exchanges 304 transmit a subscription request to server 310 requesting future updates on information including the identities of affiliated wireless terminals, the geo-locations of affiliated wireless terminals, and least-cost route information. (For convenience, FIG. 5 shows two such signal subscription requests 501, labeled 501-1 and 501-2, submitted by home private branch exchange 304-i and visitor private branch exchange 304-j, respectively.) As will be appreciated by those skilled in the art, the transmission of subscription requests by a plurality of enterprise private branch exchanges might not necessarily occur simultaneously.

At signal transmission 502, affiliated wireless terminal 301 transmits to server 310 an indication of its current geo-location (e.g. GPS coordinates, current cell ID, etc.), and an indication of a change in its identity (e.g., its user has inserted a new SIM card, etc.).

After receiving signal transmission 502, server 310 determines which of the enterprise's private branch exchange is "closest" to the terminal (i.e., the identity of visitor private branch exchange 304-j, which is already depicted in FIG. 5) and updates least-cost routes, if necessary.

At signal transmission 503, server 310 notifies wireless terminal 301 of the identity of visitor private branch exchange 304-j for subsequent calls made from the terminal.

At signal transmission 504, server 310 notifies home private branch exchange 304-i of terminal 301's new identity, and of any updated least-cost route information. In response to signal transmission 504, home private branch exchange 304-i accordingly updates its table mapping off-premises telephone numbers to on-premises telephone numbers.

At signal transmission 505, server 310 notifies visitor private branch exchange 304-j of the presence of wireless terminal 301 and any updated least-cost route information.

Figure 6:
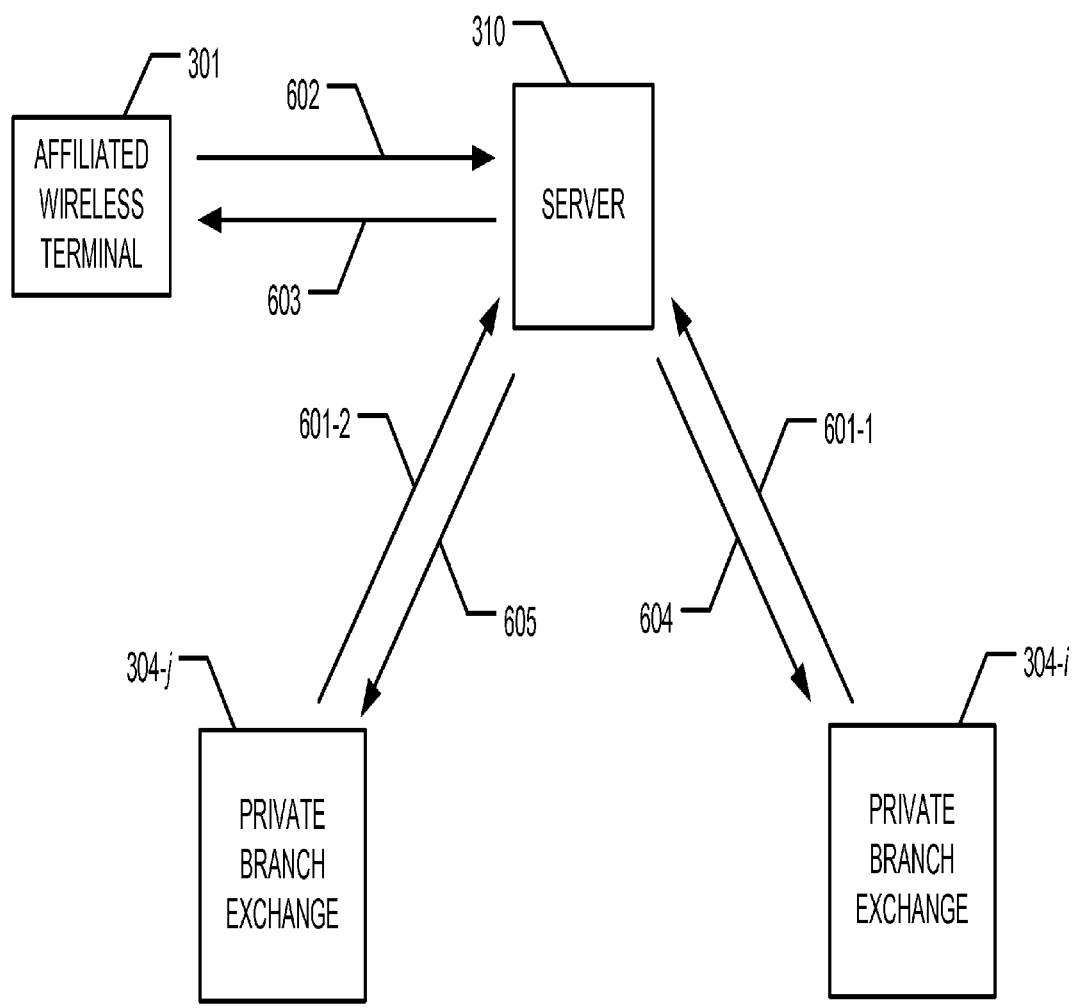
FIG. 6 depicts the transmission of signals among elements of telecommunications system 300 during registration of affiliated wireless terminal 301 in response to a geo-locational change for terminal 301, accordance with the first illustrative embodiment of the present invention.

FIG. 6 depicts the transmission of signals among elements of telecommunications system 300 during registration of affiliated wireless terminal 301 in response to a geo-locational change for terminal 301, accordance with the first illustrative embodiment of the present invention. In particular, FIG. 6 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 6; moreover, it will be clear to those skilled in the art, after reading this disclosure, which signal transmissions of FIG. 6 can be performed simultaneously or in a different order than that depicted.

At signal transmission 601, one or more enterprise private branch exchanges 304 transmit a subscription request to server 310 requesting future updates on information including the identities of affiliated wireless terminals, the geo-locations of affiliated wireless terminals, and least-cost route information. (For convenience, FIG. 6 shows two such signal subscription requests 601, labeled 601-1 and 601-2, submitted by home private branch exchange 304-i and visitor private branch exchange 304-j, respectively.) As will be appreciated by those skilled in the art, the transmission of subscription requests by a plurality of enterprise private branch exchanges might not necessarily occur simultaneously.

At signal transmission 602, affiliated wireless terminal 301 transmits to server 310 an indication of its current geo-location (e.g. GPS coordinates, current cell ID, etc.), in well-known fashion.

After receiving signal transmission 602, server 310 determines the identity of visitor private branch exchange 304-j (already depicted in FIG. 6), and updates least-cost routes, if necessary.

At signal transmission 603, server 310 notifies wireless terminal 301 of the identity of visitor private branch exchange 304-j for subsequent calls made from the terminal.

At signal transmission 604, server 310 notifies home private branch exchange 304-i of terminal 301's new identity, and of any updated least-cost route information.

At signal transmission 605, server 310 notifies visitor private branch exchange 304j of the presence of wireless terminal 301 and of any updated least-cost route information.

Figure 7:
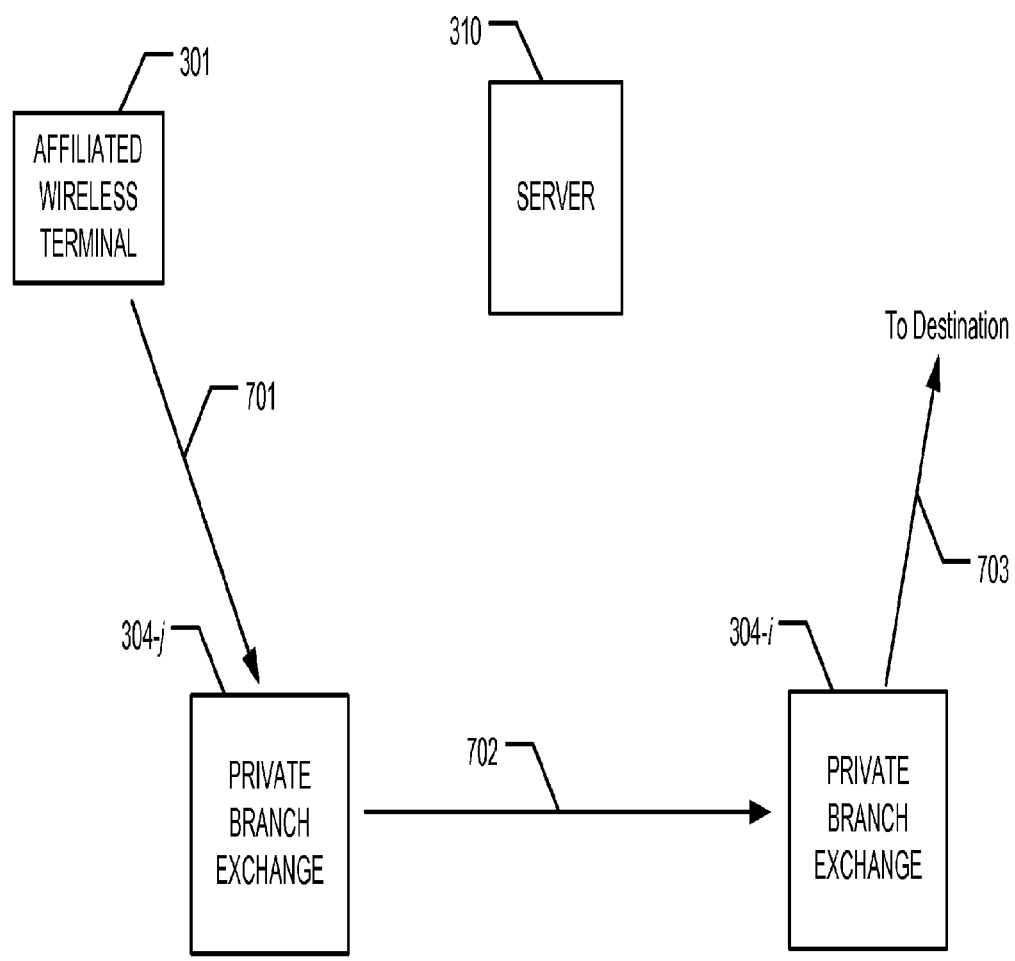
FIG. 7 depicts the transmission of signals among elements of telecommunications system 300 when affiliated wireless terminal 301 places a call, in accordance with the first illustrative embodiment of the present invention.

FIG. 7 depicts the transmission of signals among elements of telecommunications system 300 when affiliated wireless terminal 301 places a call, in accordance with the first illustrative embodiment of the present invention. In particular, FIG. 7 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 7; moreover, it will be clear to those skilled in the art, after reading this disclosure, which signal transmissions of FIG. 7 can be performed simultaneously or in a different order than that depicted.

At signal transmission 701, affiliated wireless terminal 301 places a call by transmitting a signal to visitor private branch exchange 304-j that specifies a particular destination (e.g., the telephone number of another wireless terminal, etc.) and instructs the PBX to route the call to the specified destination.

At signal transmission 702, visitor private branch exchange 304-j routes the call to home private branch exchange 304-i, in well-known fashion.

At signal transmission 703, home private branch exchange 304-i extends the call to the destination, in well-known fashion. As will be appreciated by those skilled in the art, the call might be extended to a destination whose telephone number is in the address space of home private branch exchange 304-i, or an extension within the address space of home private branch exchange 304-i that does not correspond to any terminal, or might be routed externally to a terminal whose telephone number is outside the address space of home private branch exchange 304-i (as depicted in FIG. 7).

Figure 8:
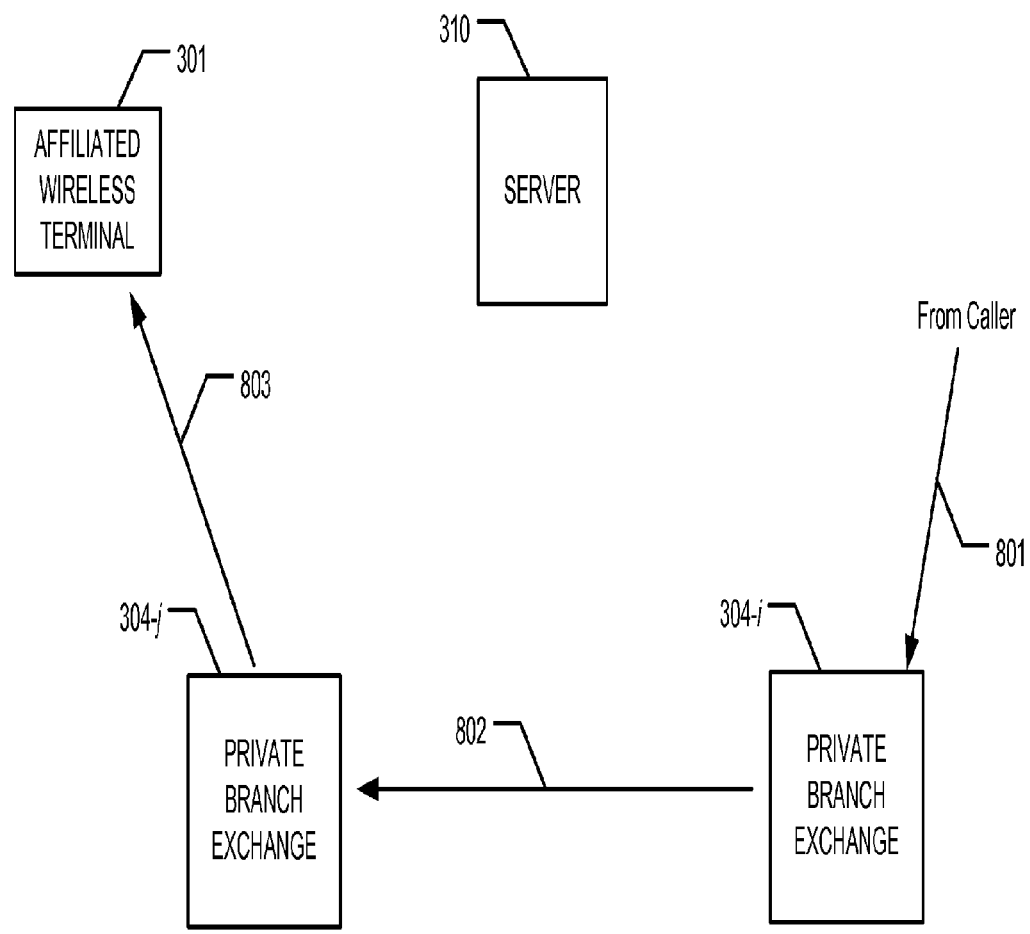
FIG. 8 depicts the transmission of signals among elements of telecommunications system 300 when affiliated wireless terminal 301 receives a call that is directed to its associated on-premises terminal, in accordance with the first illustrative embodiment of the present invention.

FIG. 8 depicts the transmission of signals among elements of telecommunications system 300 when affiliated wireless terminal 301 receives a call that is directed to its associated on-premises terminal, in accordance with the first illustrative embodiment of the present invention. In particular, FIG. 8 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 8; moreover, it will be clear to those skilled in the art, after reading this disclosure, which signal transmissions of FIG. 8 can be performed simultaneously or in a different order than that depicted.

At signal transmission 801, home private branch exchange 304-i receives a call that is directed to the on-premises telephone number associated with affiliated wireless terminal 301. As will be appreciated by those skilled in the art, the call might originate from a terminal whose telephone number is in the address space of home private branch exchange 304-i, or might originate from a terminal whose telephone number is outside the address space of home private branch exchange 304-i (as depicted in FIG. 8).

At signal transmission 802, home private branch exchange 304-i routes the call to visitor private branch exchange 304-j, in well-known fashion.

At signal transmission 803, visitor private branch exchange 304-j extends the call to affiliated wireless terminal 301, in well-known fashion.

Figure 9:
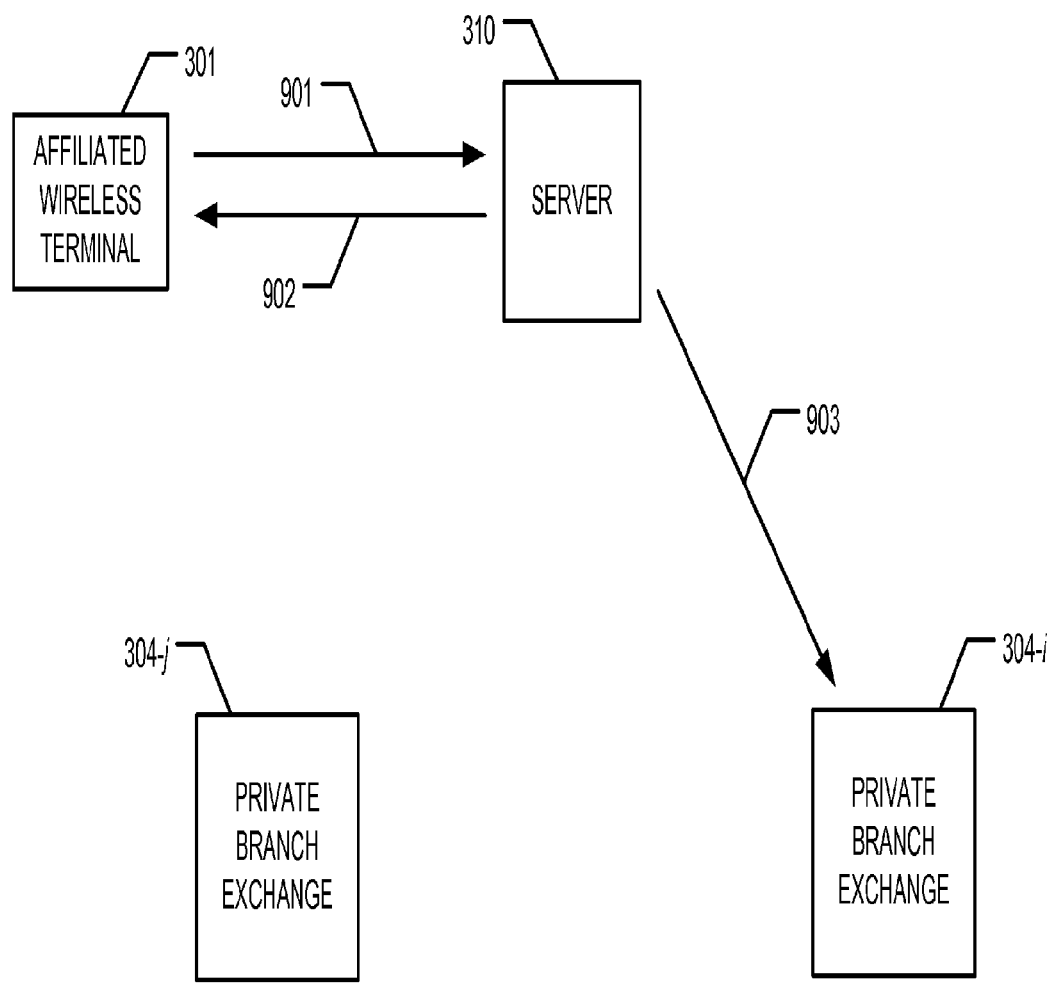
FIG. 9 depicts the transmission of signals among elements of telecommunications system 300 during registration of affiliated wireless terminal 301 in response to an identity change at terminal 301, in accordance with both the second and third illustrative embodiments of the present invention.

FIG. 9 depicts the transmission of signals among elements of telecommunications system 300 during registration of affiliated wireless terminal 301 in response to an identity change at terminal 301, in accordance with both the second and third illustrative embodiments of the present invention. In particular, FIG. 9 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 9; moreover, it will be clear to those skilled in the art, after reading this disclosure, which signal transmissions of FIG. 9 can be performed simultaneously or in a different order than that depicted.

At signal transmission 901, affiliated wireless terminal 301 transmits to server 310 an indication of its current geo-location (e.g. GPS coordinates, current cell ID, etc.), and an indication of a change in its identity (e.g., its user has inserted a new SIM card, etc.).

After receiving signal transmission 901, server 310 determines which of the enterprise's private branch exchange is "closest" to the terminal (i.e., the identity of visitor private branch exchange 304-j, which is already depicted in FIG. 9) and updates least-cost routes, if necessary.

At signal transmission 902, server 310 notifies wireless terminal 301 of the identity of visitor private branch exchange 304-j for subsequent calls made from the terminal.

At signal transmission 903, server 310 notifies home private branch exchange 304-i of terminal 301's new identity. In response to signal transmission 903, home private branch exchange 304-i accordingly updates its table mapping off-premises telephone numbers to on-premises telephone numbers.

Figure 10:
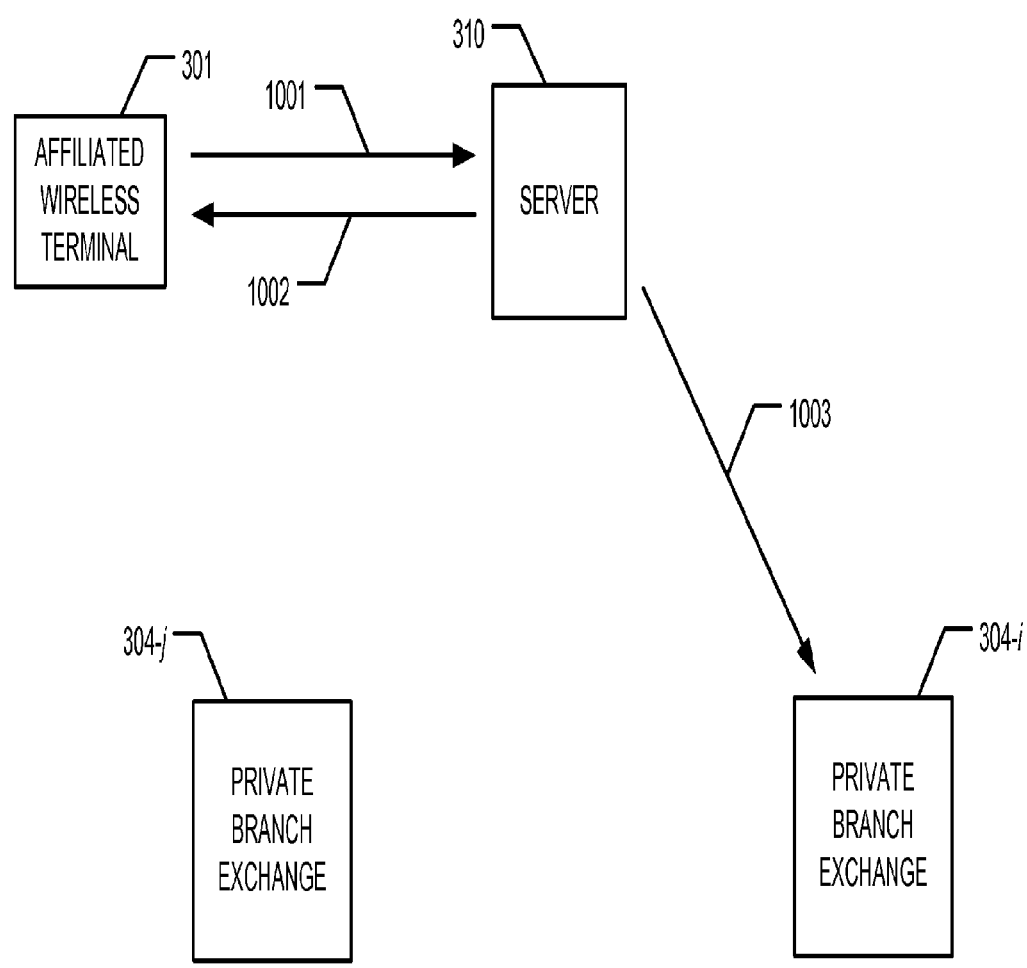
FIG. 10 depicts the transmission of signals among elements of telecommunications system 300 during registration of affiliated wireless terminal 301 in response to a geo-locational change for terminal 301, in accordance with both the second and third illustrative embodiments of the present invention.

FIG. 10 depicts the transmission of signals among elements of telecommunications system 300 during registration of affiliated wireless terminal 301 in response to a geo-locational change for terminal 301, in accordance with both the second and third illustrative embodiments of the present invention.

In particular, FIG. 10 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 10; moreover, it will be clear to those skilled in the art, after reading this disclosure, which signal transmissions of FIG. 10 can be performed simultaneously or in a different order than that depicted.

At signal transmission 1001, affiliated wireless terminal 301 transmits to server 310 an indication of its current geo-location (e.g. GPS coordinates, current cell ID, etc.), in well-known fashion.

After receiving signal transmission 1001, server 310 determines which of the enterprise's private branch exchange is "closest" to the terminal (i.e., the identity of visitor private branch exchange 304-j, which is already depicted in FIG. 10) and updates least-cost routes, if necessary.

At signal transmission 1002, server 310 notifies wireless terminal 301 of the identity of visitor private branch exchange 304-j for subsequent calls made from the terminal.

At signal transmission 1003, server 310 notifies home private branch exchange 304-i of terminal 301's new identity. In response to signal transmission 1003, home private branch exchange 304-i accordingly updates its table mapping off-premises telephone numbers to on-premises telephone numbers.

Figure 11:
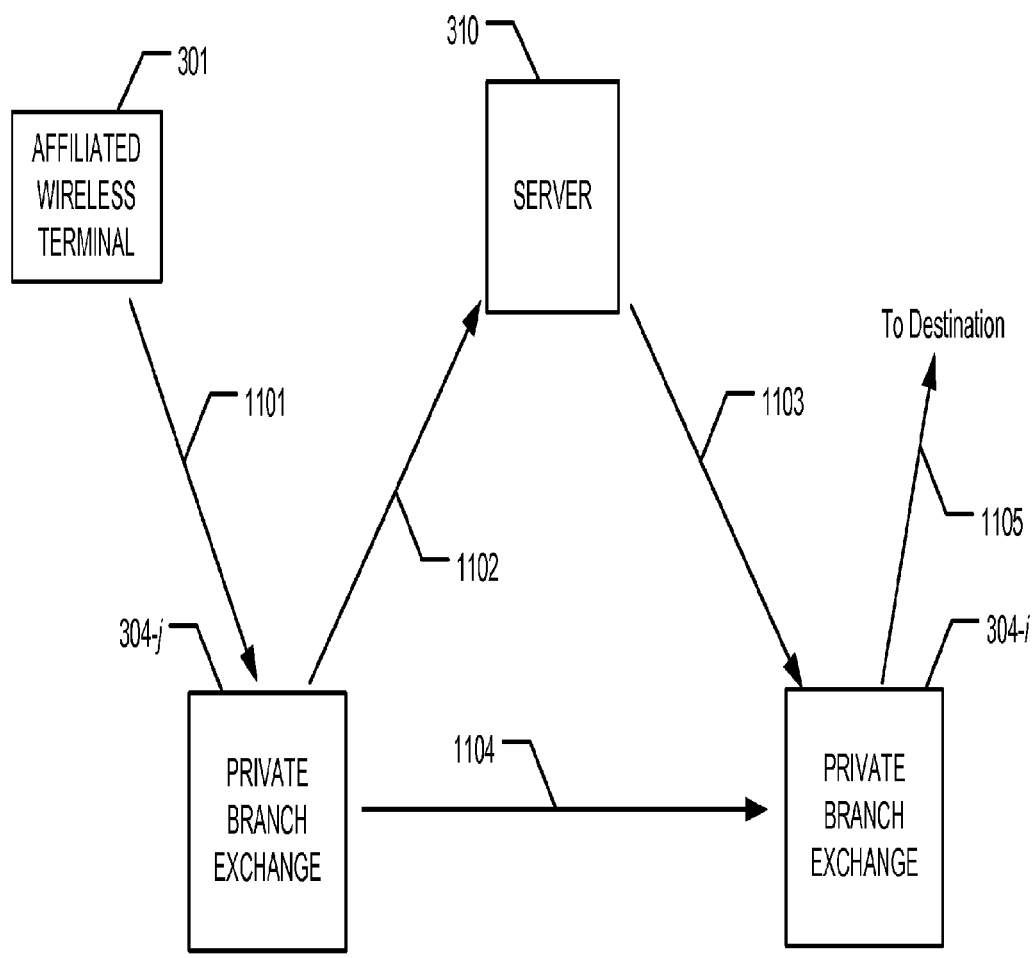
FIG. 11 depicts the transmission of signals among elements of telecommunications system 300 when affiliated wireless terminal 301 places a call, in accordance with the second illustrative embodiment of the present invention.

FIG. 11 depicts the transmission of signals among elements of telecommunications system 300 when affiliated wireless terminal 301 places a call, in accordance with the second illustrative embodiment of the present invention. In particular, FIG. 11 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 11; moreover, it will be clear to those skilled in the art, after reading this disclosure, which signal transmissions of FIG. 11 can be performed simultaneously or in a different order than that depicted.

At signal transmission 1101, affiliated wireless terminal 301 places a call by transmitting a signal to visitor private branch exchange 304-j that specifies a particular destination (e.g., the telephone number of another wireless terminal, etc.) and instructs the PBX to route the call to the specified destination.

At signal transmission 1102, visitor private branch exchange 304-j routes the call to server 310, in well-known fashion.

At signal transmission 1103, server 310 routes the call to home private branch exchange 304-i, in well-known fashion.

At signal transmission 1104, the portion of the call connecting visitor private branch exchange 304-j to home private branch exchange 304-i is dropped from the call, and that portion is replaced by a new least-cost call that does not necessarily pass through server 310. The remaining portion of the original call is then connected with the new call, in well-known fashion.

At signal transmission 1105, the connected call is then extended to the specified destination, in well-known fashion. As will be appreciated by those skilled in the art, the call might be extended to a destination whose telephone number is in the address space of home private branch exchange 304-i, or an extension within the address space of home private branch exchange 304-i that does not correspond to any terminal, or might be routed externally to a terminal whose telephone number is outside the address space of home private branch exchange 304-i (as depicted in FIG. 11).

Figure 12:
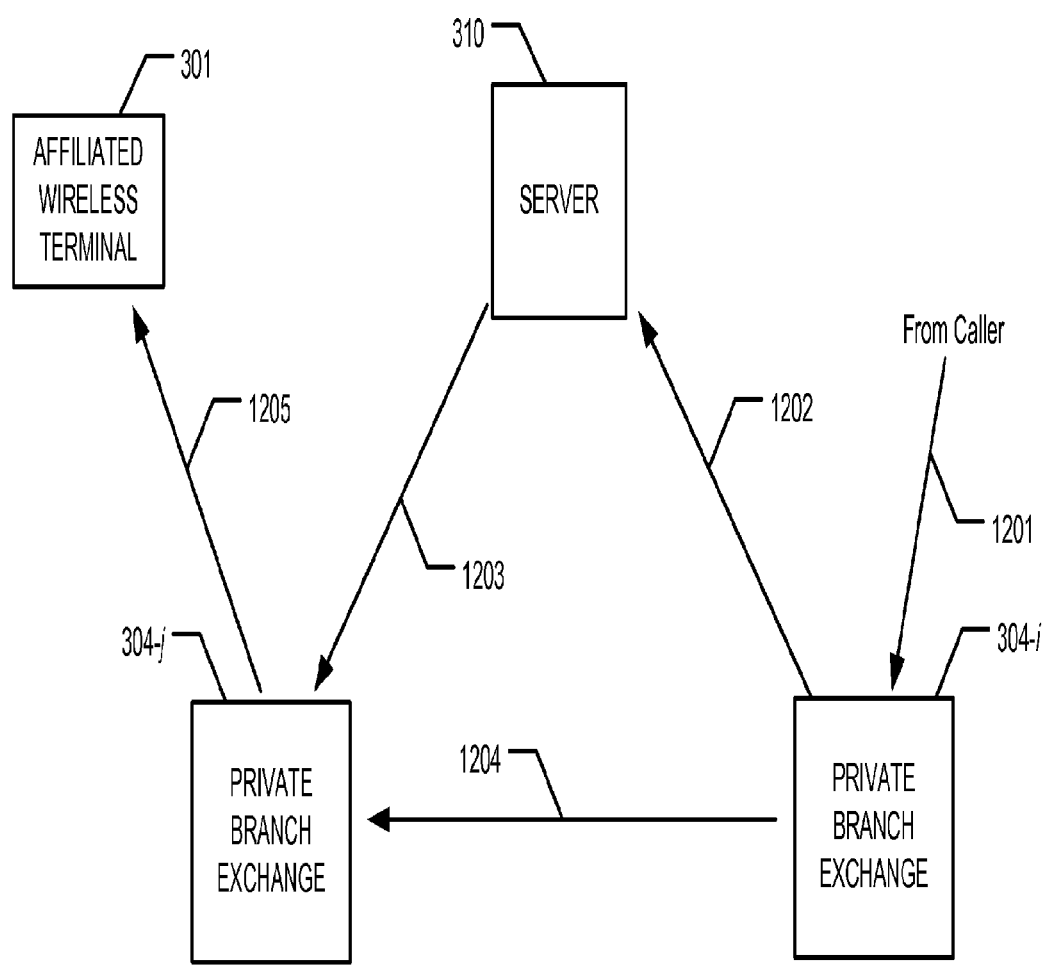
FIG. 12 depicts the transmission of signals among elements of telecommunications system 300 when affiliated wireless terminal 301 receives a call that is directed to its associated on-premises terminal, in accordance with the second illustrative embodiment of the present invention.

FIG. 12 depicts the transmission of signals among elements of telecommunications system 300 when affiliated wireless terminal 301 receives a call that is directed to its associated on-premises terminal, in accordance with the second illustrative embodiment of the present invention. In particular, FIG. 12 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 12; moreover, it will be clear to those skilled in the art, after reading this disclosure, which signal transmissions of FIG. 12 can be performed simultaneously or in a different order than that depicted.

At signal transmission 1201, home private branch exchange 304-i receives a call that is directed to the on-premises telephone number associated with affiliated wireless terminal 301. As will be appreciated by those skilled in the art, the call might originate from a terminal whose telephone number is in the address space of home private branch exchange 304-i, or might originate from a terminal whose telephone number is outside the address space of home private branch exchange 304-i (as depicted in FIG. 12).

At signal transmission 1202, home private branch exchange 304-i routes the call to server 310, in well-known fashion.

At signal transmission 1203, server 310 routes the call to visitor private branch exchange 304-j, in well-known fashion.

At signal transmission 1204, the portion of the call connecting home private branch exchange 304-i to visitor private branch exchange 304-j is dropped from the call, and that portion is replaced by a new least-cost call that does not necessarily pass through server 310. The remaining portion of the original call is then connected with the new call, in well-known fashion.

At signal transmission 1205, visitor private branch exchange 304-j extends the call to affiliated wireless terminal 301, in well-known fashion.

Figure 13:
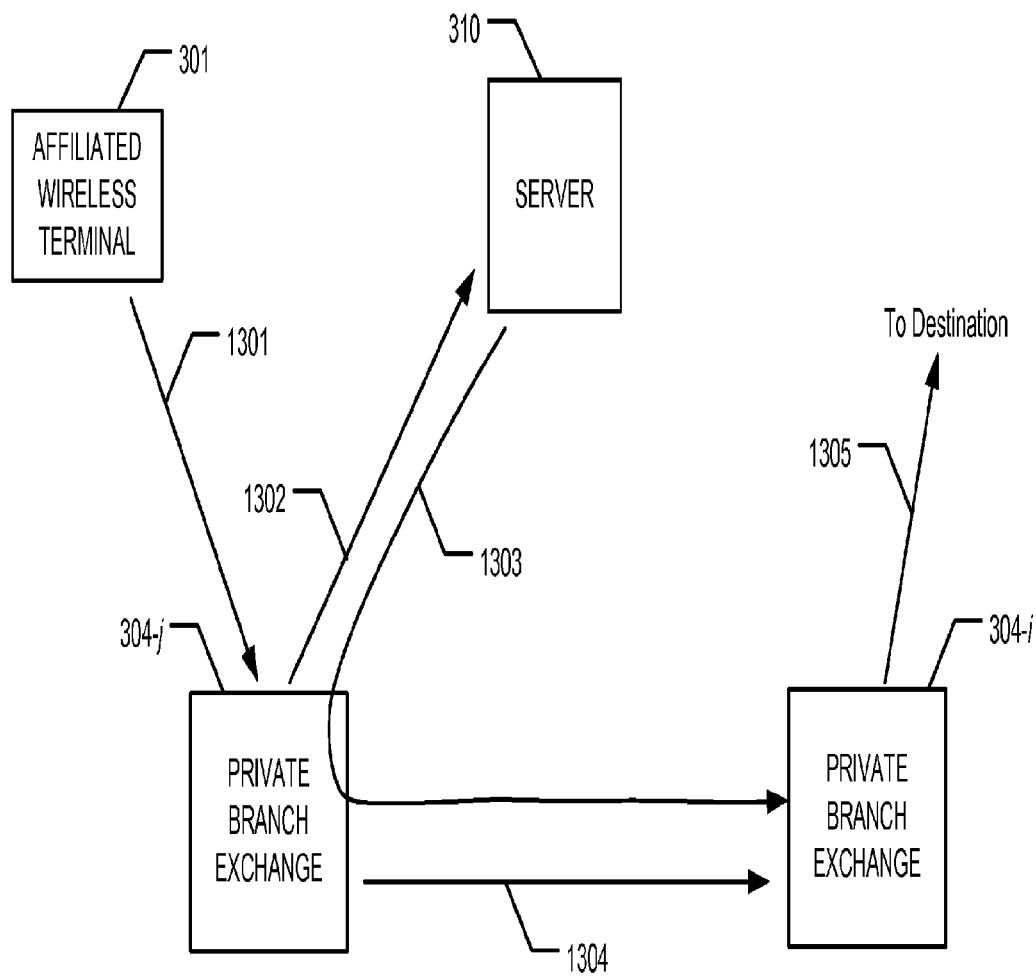
FIG. 13 depicts the transmission of signals among elements of telecommunications system 300 when affiliated wireless terminal 301 places a call, in accordance with the third illustrative embodiment of the present invention.

FIG. 13 depicts the transmission of signals among elements of telecommunications system 300 when affiliated wireless terminal 301 places a call, in accordance with the third illustrative embodiment of the present invention. In particular, FIG. 13 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 13; moreover, it will be clear to those skilled in the art, after reading this disclosure, which signal transmissions of FIG. 13 can be performed simultaneously or in a different order than that depicted.

At signal transmission 1301, affiliated wireless terminal 301 places a call by transmitting a signal to visitor private branch exchange 304-j that specifies a particular destination (e.g., the telephone number of another wireless terminal, etc.) and instructs the PBX to route the call to the specified destination.

At signal transmission 1302, visitor private branch exchange 304-j routes the call to server 310, in well-known fashion.

At signal transmission 1303, server 310 routes the call to home private branch exchange 304-i along a route that includes visitor private branch exchange 304-j, in well-known fashion.

At signal transmission 1304, the portion of the call connecting visitor private branch exchange 304-j to server 310 back to visitor private branch exchange 304-j is dropped from the call.

At signal transmission 1305, the call is then extended to the specified destination, in well-known fashion. As will be appreciated by those skilled in the art, the call might be extended to a destination whose telephone number is in the address space of home private branch exchange 304-i, or an extension within the address space of home private branch exchange 304-i that does not correspond to any terminal, or might be routed externally to a terminal whose telephone number is outside the address space of home private branch exchange 304-i (as depicted in FIG. 13).

In some other embodiments of the present invention, signal transmission signal transmission 1304 might be omitted, and at signal transmission 1303 server 310 might instead establish a new call to home private branch exchange 304-i along a route that includes visitor private branch exchange 304-j. In such embodiments, the portions of the original and new calls connecting visitor private branch exchange 304-j and server 310 are subsequently dropped, and the remaining portions of the original and new calls are then connected, in well-known fashion.

In still some other embodiments, at signal transmission 1303 server 310 might transmit a signal that instructs visitor private branch exchange 304-j to route the call to home private branch exchange 304-i, in which case at signal transmission 1304 visitor private branch exchange 304-j carries out this instruction.

Figure 14:
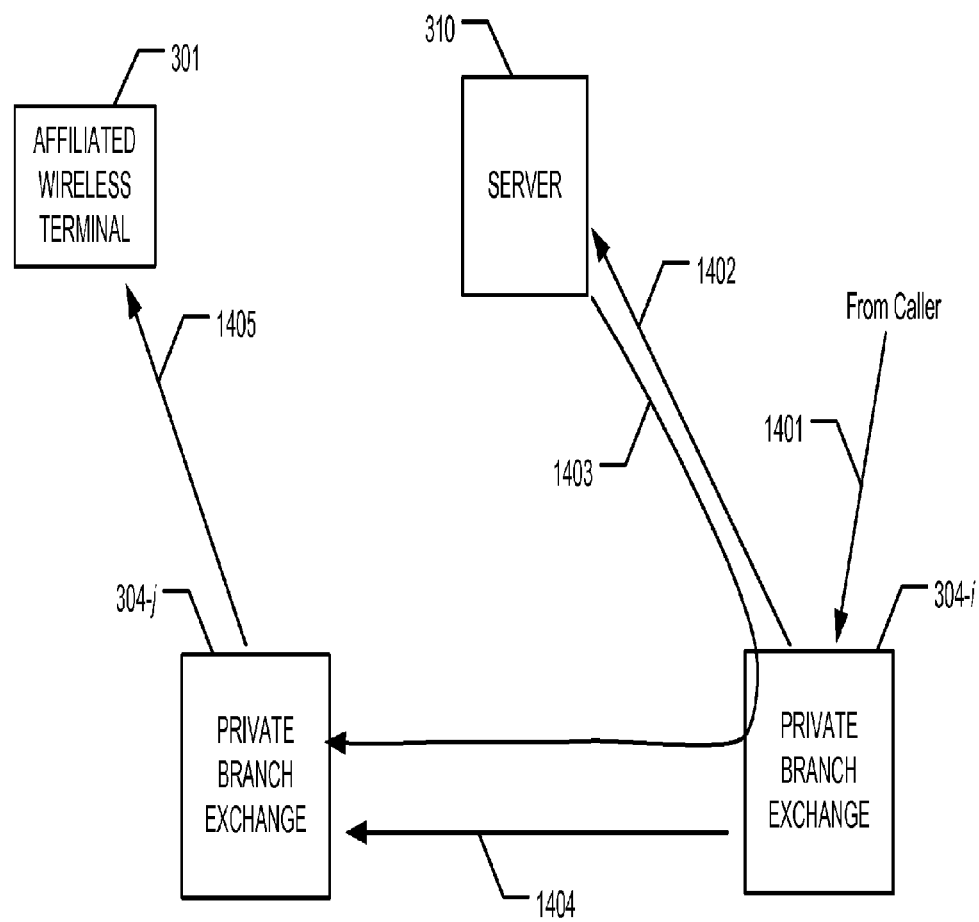
FIG. 14 depicts the transmission of signals among elements of telecommunications system 300 when affiliated wireless terminal 301 receives a call that is directed to its associated on-premises terminal, in accordance with the third illustrative embodiment of the present invention.

FIG. 14 depicts the transmission of signals among elements of telecommunications system 300 when affiliated wireless terminal 301 receives a call that is directed to its associated on-premises terminal, in accordance with the third illustrative embodiment of the present invention. In particular, FIG. 14 depicts the transmission of signals among affiliated wireless terminal 301, server 310, home private branch exchange 304-i, and visitor private branch exchange 304-j. It will be clear to those skilled in the art, after reading this disclosure, how to make and use embodiments of the present invention in accordance with FIG. 14; moreover, it will be clear to those skilled in the art, after reading this disclosure, which signal transmissions of FIG. 14 can be performed simultaneously or in a different order than that depicted.

At signal transmission 1401, home private branch exchange 304-i receives a call that is directed to the on-premises telephone number associated with affiliated wireless terminal 301. As will be appreciated by those skilled in the art, the call might originate from a terminal whose telephone number is in the address space of home private branch exchange 304-i, or might originate from a terminal whose telephone number is outside the address space of home private branch exchange 304-i (as depicted in FIG. 14).

At signal transmission 1402, home private branch exchange 304-i routes the call to server 310, in well-known fashion.

At signal transmission 1403, server 310 routes the call to home private branch exchange 304-i along a route that includes visitor private branch exchange 304-j, in well-known fashion.

At signal transmission 1404, the portion of the call connecting home private branch exchange 304-i to server 310 back to home private branch exchange 304-i is dropped from the call.

At signal transmission 1405, visitor private branch exchange 304-j extends the call to affiliated wireless terminal 301, in well-known fashion.

In some other embodiments of the present invention, signal transmission signal transmission 1404 might be omitted, and at signal transmission 1403 server 310 might instead establish a new call to visitor private branch exchange 304-j along a route that includes home private branch exchange 304-i. In such embodiments, the portions of the original and new calls connecting home private branch exchange 304-i and server 310 are subsequently dropped, and the remaining portions of the original and new calls are then connected, in well-known fashion.

In still some other embodiments, at signal transmission 1403 server 310 might transmit a signal that instructs home private branch exchange 304-i to route the call to visitor private branch exchange 304-j, in which case at signal transmission 1404 home private branch exchange 304-i carries out this instruction.

As will be appreciated by those skilled in the art, although the illustrative embodiment is disclosed in the context of reducing toll charges, it will be clear to those skilled in the art, after reading this disclosure, how to make and use other embodiments of the present invention that reduce other kinds of costs (e.g., transmission delay, distance traveled, number of network segments traversed, etc.).

As will be further appreciated by those skilled in the art, although the illustrative embodiment does not explicitly include any mechanism by which private branch exchanges 304 authenticate affiliated terminal 301, such authentication methods are well-known in the art, and it will be clear to those skilled in the art, after reading this disclosure, how to make and use embodiments of the present invention that incorporate such methods.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   determining, by a processor, a first change in a geo-location of a cellular phone as the cellular phone moves from a first location to a second location and a second change in a telephone number of the cellular phone from a first telephone number to a second telephone number, wherein the cellular phone is affiliated with a first private branch exchange;
   based on the first change and the second change, determining, by the processor, a second private branch exchange that has a least communication cost to the cellular phone at the second location; and
   determining, by the processor, a least-cost route from among a plurality of routes for a call between the first private branch exchange and the second private branch exchange; and based on the least-cost route, routing, by the processor, the call between the cellular phone and the first private branch exchange via the second private branch exchange, wherein routing the call comprises:
   routing the call from the second private branch exchange to the first private branch exchange via a server;

dropping a portion of the call connecting the second private branch exchange to the first private branch exchange;

replacing the dropped portion of the call with a new least-cost call that does not pass through the server; and connecting a remaining portion of the call with the new least-cost call.

2. The method of claim 1, wherein the first telephone number is a first off-premises telephone number that exists within a first address space and the second telephone number is a second off-premises telephone number that exists within the first address space, and wherein the second change in the telephone number from the first telephone number to the second telephone number is based on a change of a mapping of an on-premises telephone number from the first off-premises telephone number to the second off-premises telephone number, wherein the on-premises telephone number exists within a second address space that is different than the first address space.

3. The method of claim 2, wherein the first address space is associated with a public switched telephone network, and wherein the second address space is associated with one of the first private branch exchange, the second private branch exchange, or a third private branch exchange in a network associated with the first and second private branch exchanges.

4. The method of claim 1, wherein determining the second change in telephone number of the cellular phone comprises determining a change in a subscriber identification module associated with the cellular phone, and wherein determining the first change in the geo-location comprises determining a change in at least one of GPS coordinates associated with the cellular phone or a current cellular ID associated with the cellular phone.

5. The method of claim 1, wherein the second private branch exchange is determined further based on the least-cost route.

6. The method of claim 1, further comprising:
receiving the call at a third telephone number associated with a server connected to the first private branch exchange; and
routing the call from the first private branch exchange to the server.

7. The method of claim 6, wherein the call is a first call, the method further comprising:
establishing a second call from the server to the second private branch exchange;
dropping from the second call a portion of an associated route that connects the server to the first private branch exchange; and
connecting the first call and the second call to yield a connected call.

8. The method of claim 7, further comprising extending the connected call to the cellular phone at a third telephone number in a second address space associated with the second private branch exchange.

9. The method of claim 1, further comprising determining a third change in a subscriber identification module associated with the cellular phone from a first subscriber identification module to a second subscriber identification module, and wherein determining the second private branch exchange is further based on the third change of the subscriber identification module.

10. A system comprising:
a processor; and a computer-readable storage medium storing instructions which, when executed by the processor, cause the processor to perform operations comprising:
determining a first change in a geo-location of a cellular phone as the cellular phone moves from a first location to a second location and a second change in a telephone number of the cellular phone from a first telephone number to a second telephone number, wherein the cellular phone is affiliated with a first private branch exchange;
based on the first change and the second change, determining a second private branch exchange that has a least communication cost to the cellular phone at the second location;
determining a least-cost route from among a plurality of routes for a call between the first private branch exchange and the second private branch exchange; and
routing the call between the cellular phone and the first private branch exchange via the second private branch exchange by:
routing the call from the second private branch exchange to the first private branch exchange via a server;
replacing a portion of the call connecting the second private branch exchange to the first private branch exchange with a new call that does not pass through the server; and
connecting a remaining portion of the call with the new call.

11. The system of claim 10, wherein the first telephone number is a first off-premises telephone number that exists within a first address space and the second telephone number is a second off-premises telephone number that exists within the first address space, and wherein the second change in the telephone number from the first telephone number to the second telephone number is based on a change of a mapping of an on-premises telephone number from the first off-premises telephone number to the second off-premises telephone number, wherein the on-premises telephone number exists within a second address space that is different than the first address space.

12. The system of claim 11, wherein the first address space is associated with a public switched telephone network, and wherein the second address space is associated with one of the first private branch exchange, the second private branch exchange, or a third private branch exchange in a network associated with the first and second private branch exchanges.

13. The system of claim 10, wherein determining the second change in telephone number of the cellular phone comprises determining a change in a subscriber identification module associated with the cellular phone, and wherein determining the first change in the geo-location comprises determining a change in at least one of GPS coordinates associated with the cellular phone or a current cellular ID associated with the cellular phone.

14. The system of claim 10, wherein routing the call further comprises:
dropping the portion of the call connecting the second private branch exchange to the first private branch exchange, wherein the new call comprises a new least-cost call.

15. A system comprising:
a processor; and a computer-readable storage medium storing instructions which, when executed by the processor, cause the processor to perform operations comprising:
determining a first change in a geo-location of a cellular phone as the cellular phone moves from a first location to a second location and a second change in an identity associated with the cellular phone, wherein the cellular phone is affiliated with a first private branch exchange, and wherein the second change in the identity comprises at least one of a change in a telephone number of the cellular phone or a change in a subscriber identification module of the cellular phone from a first subscriber identification module to a second subscriber identification module;
based on the first change and the second change, determining a second private branch exchange that has a least communication cost to the cellular phone at the second location;
determining a least-cost route from among a plurality of routes for a call between the first private branch exchange and the second private branch exchange; and
based on the least-cost route, routing the call between the cellular phone and the first private branch exchange via the second private branch exchange, wherein routing the call comprises:
routing the call from the second private branch exchange to the first private branch exchange via a server;
dropping a portion of the call connecting the second private branch exchange to the first private branch exchange;
replacing the dropped portion of the call with a new least-cost call that does not pass through the server; and
connecting a remaining portion of the call with the new least-cost call.

16. The system of claim 15, wherein the first telephone number is a first off-premises telephone number that exists within a first address space and the second telephone number is a second off-premises telephone number that exists within the first address space, and wherein the second change in the telephone number from the first telephone number to the second telephone number is based on a change of a mapping of an on-premises telephone number from the first off-premises telephone number to the second off-premises telephone number, wherein the on-premises telephone number exists within a second address space that is different than the first address space.

17. The system of claim 16, wherein the first address space is associated with a public switched telephone network, and wherein the second address space is associated with one of the first private branch exchange, the second private branch exchange, or a third private branch exchange in a network associated with the first and second private branch exchanges.

18. The system of claim 15, wherein determining the first change in the geo-location comprises determining a change in at least one of GPS coordinates associated with the cellular phone or a current cellular ID associated with the cellular phone.

* * * * *